United States Patent
Wu et al.

(10) Patent No.: US 11,029,763 B2
(45) Date of Patent: Jun. 8, 2021

(54) INPUT DEVICE AND ELECTRONIC DEVICE

(71) Applicant: Lenovo (Beijing) Co., Ltd., Beijing (CN)

(72) Inventors: Bingjie Wu, Beijing (CN); Jen-chen Lu, Beijing (CN); Bin Shi, Beijing (CN); Kohei Shibata, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/586,958

(22) Filed: Sep. 28, 2019

(65) Prior Publication Data
US 2020/0103982 A1 Apr. 2, 2020

(30) Foreign Application Priority Data

Sep. 30, 2018 (CN) .......................... 201811156970.5
Apr. 1, 2019 (CN) .......................... 201910257766.0

(51) Int. Cl.
| | |
|---|---|
| *G06F 3/023* | (2006.01) |
| *H01H 13/88* | (2006.01) |
| *G06F 3/02* | (2006.01) |
| *H01H 13/705* | (2006.01) |

(52) U.S. Cl.
CPC ............ *G06F 3/023* (2013.01); *G06F 3/0202* (2013.01); *H01H 13/705* (2013.01); *H01H 13/88* (2013.01)

(58) Field of Classification Search
CPC ..... G06F 3/023; G06F 3/0202; H01H 13/705; H01H 13/88
See application file for complete search history.

(56) References Cited

U.S. PATENT DOCUMENTS

| | | | |
|---|---|---|---|
| 9,241,552 B2* | 1/2016 | Hunter | A45C 11/00 |
| 2012/0161988 A1* | 6/2012 | Chang | H01H 13/83 |
| | | | 341/22 |
| 2018/0232061 A1* | 8/2018 | Cho | G06F 3/038 |

FOREIGN PATENT DOCUMENTS

| | | |
|---|---|---|
| CN | 1347524 A | 5/2002 |
| CN | 1519977 A | 8/2004 |
| CN | 104007786 A | 8/2014 |
| CN | 106301323 A | 1/2017 |

* cited by examiner

*Primary Examiner* — Sejoon Ahn
(74) *Attorney, Agent, or Firm* — Anova Law Group, PLLC

(57) ABSTRACT

An input device and an electronic device are provided. The input device includes one or more force-receiving portions configured to receive an external force applied by an operation object. The input device also includes a moving portion corresponding to each force-receiving portion and configured to move in response to the external force received on a corresponding force-receiving portion satisfying a first condition. In addition, the input device includes a trigger portion corresponding to each moving portion and configured to generate an input signal after a motion of a corresponding moving portion satisfies a second condition. Further, the input device includes one or more radiation portions configured to transmit or receive a wireless signal.

16 Claims, 6 Drawing Sheets

INPUT DEVICE AND ELECTRONIC DEVICE

CROSS-REFERENCES TO RELATED APPLICATIONS

This application claims the priority of Chinese patent applications No. 201811156970.5, filed on Sep. 30, 2018, and No. 201910257766.0, filed on Apr. 1, 2019, the entirety of all of which is incorporated herein by reference.

FIELD OF THE DISCLOSURE

The present disclosure generally relates to the field of computer technology and, more particularly, relates to an input device, and an electronic device.

BACKGROUND

With the rise of network, the mobile communication industry has ushered in a period of rapid development. Electronic devices are moving further toward a direction of Internet online devices. An electronic device includes an input device, e.g., a keyboard, a microphone, or a mouse, etc. Currently, the input device often has single type of functions.

The disclosed input device and electronic device are directed to solve one or more problems set forth above and other problems.

BRIEF SUMMARY OF THE DISCLOSURE

One aspect of the present disclosure includes an input device. The input device includes one or more force-receiving portions configured to receive an external force applied by an operation object. The input device also includes a moving portion corresponding to each force-receiving portion and configured to move in response to the external force received on a corresponding force-receiving portion satisfying a first condition. In addition, the input device includes a trigger portion corresponding to each moving portion and configured to generate an input signal after a motion of a corresponding moving portion satisfies a second condition. Further, the input device includes one or more radiation portions configured to transmit or receive a wireless signal.

Another aspect of the present disclosure includes an electronic device. The electronic device includes an input device. The input device includes one or more force-receiving portions configured to receive an external force applied by an operation object. The input device also includes a moving portion corresponding to each force-receiving portion and configured to move in response to the external force received on a corresponding force-receiving portion satisfying a first condition. In addition, the input device includes a trigger portion corresponding to each moving portion and configured to generate an input signal after a motion of a corresponding moving portion satisfies a second condition. Further, the input device includes one or more radiation portions configured to transmit or receive a wireless signal.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to various embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on some embodiments, persons of ordinary skill in the art may derive other embodiments consistent with the present disclosure, all of which are within the scope of the present disclosure.

The disclosed embodiments in the present disclosure are merely examples for illustrating the general principles of the disclosure. Any equivalent or modification thereof, without departing from the spirit and principle of the present disclosure, falls within the true scope of the present disclosure.

An input device in the disclosed embodiments of the present disclosure may include a device capable of receiving data and information inputted by a user, for example, a device having a physical button, e.g., a keyboard, or a mouse.

In some embodiments, the input device in the disclosed embodiments of the present disclosure may be a separate keyboard, or a keyboard integrated in an electronic device. The electronic device may be a terminal with a physical keyboard, e.g., a notebook computer, a flip phone, or a straight phone having a physical keyboard, etc.

Figure 1A:
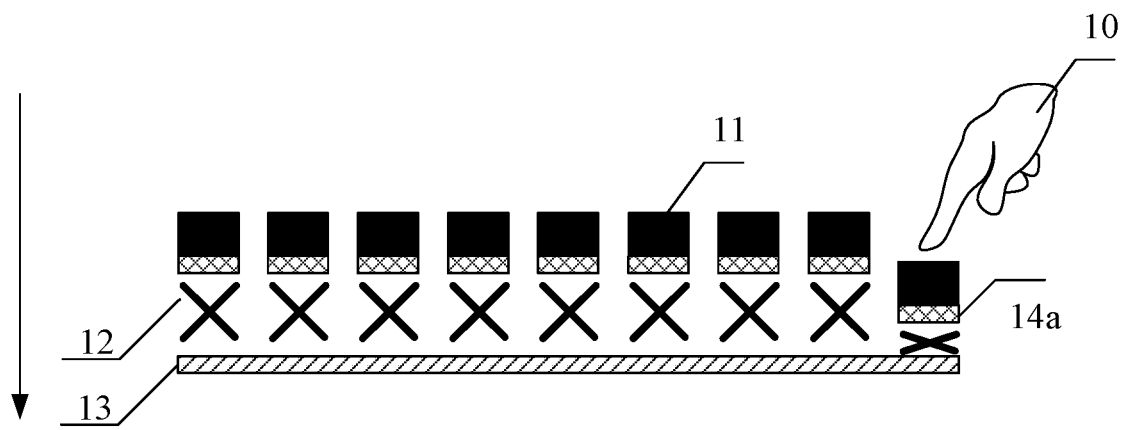
FIGS. 1a-1b illustrate schematic diagrams of examples of input devices for implementation consistent with some embodiments of the present disclosure.
Figure 1B:
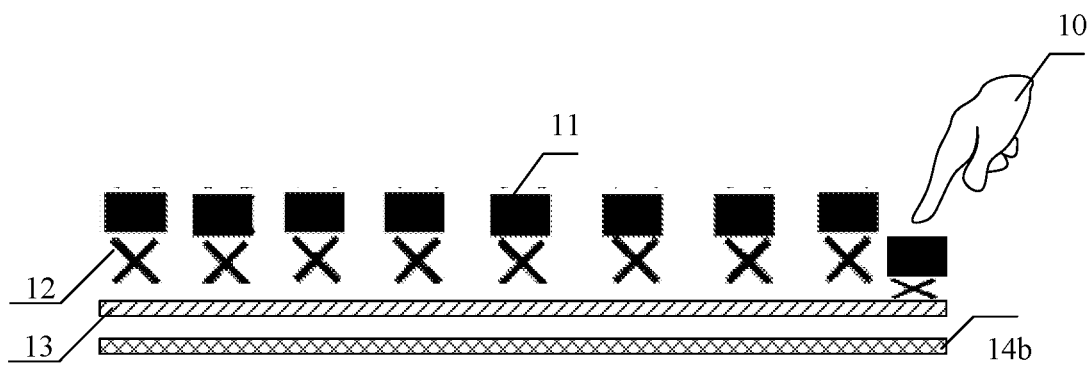

FIGS. 1a-1b illustrate schematic diagrams of examples of input devices for implementation consistent with some embodiments of the present disclosure. The input device may include one or more force-receiving portions 11, a moving portion 12 corresponding to each force-receiving portion, a trigger portion 13 corresponding to each moving portion, and one or more radiation portions 14a or 14ba or 14b. FIGS. 1a-1b are schematic diagrams of examples, and are not intended to limit the structure of the input device, any input device with suitable structures may be encompassed within the scope of the present disclosure. Likewise, the position of the radiation portion 14a or 14b illustrated in FIGS. 1a-1b is merely an example provided by the present disclosure, and does not intend to limit the scope of the present disclosure. Referring to FIGS. 1a-1b, after an operation object 10, such as a finger of an operator, a stylus, or an operation pen, applies an external force on the force-receiving portion 11, the moving portion 12 may move with the corresponding force-receiving portion 11, e.g., up and down movements as illustrated in FIG. 1.

The force-receiving portion 11 may be configured to receive an external force applied by the operation object 10. One force-receiving portion 11 may correspond to one moving portion 12, and the moving portion 12 may be configured to move after the external force received on the corresponding force-receiving portion 11 satisfying a first condition. The trigger portion 13 corresponding to one moving portion 12 may be configured to generate an input signal after the motion of the corresponding moving portion 12 satisfies a second condition. The radiation portion 14a or 14b may be configured to transmit or receive a wireless signal.

In some embodiments, after the force-receiving portion 11 receives the external force applied by the operation object 10, the moving portion 12 may move, for example, downward. The moving portion 12 may press a corresponding trigger portion 13, and the trigger portion 13 may be pressed and deformed. Therefore, the trigger portion 13 may be electrically connected to generate an input signal.

In some embodiments, the first condition may include that the external force received on the force-receiving portion 11 may be greater than or equal to a motion trigger threshold value of the moving portion. The second condition may include that the moving portion 12 may press the corresponding trigger portion 13 to enable the trigger portion 13 to be electrically connected.

After the external force received on the force-receiving portion 11 is greater than or equal to the motion trigger threshold value of the moving portion, the moving portion may move.

In some embodiments, the trigger portion 13 may include an upper contact point and a lower contact point. After the trigger portion 13 is pressed to a certain extent by the moving portion 12, the upper contact point and the lower contact point may be electrically connected to generate an input signal.

In some embodiments, the radiation portion may be an antenna, and the antenna may be a flexible printed circuit (FPC) antenna.

In the disclosed embodiments of the present disclosure, the radiation portion may be disposed in an input device having a motion-triggered force-receiving portion. Therefore, a wireless signal may be transmitted and received from the input device, which may increase the function of the input device.

For persons of ordinary skill in the art to understand the structure of the input device and the beneficial features of disposing the radiation portion in the input device provided by the disclosed embodiments of the present disclosure, for illustrative purposes, the input device may be a keyboard as an example to describe the structure of the input device, and the electronic device may be a notebook computer including a keyboard as an example to describe the issues existed in the electronic device in detail.

Figure 2:
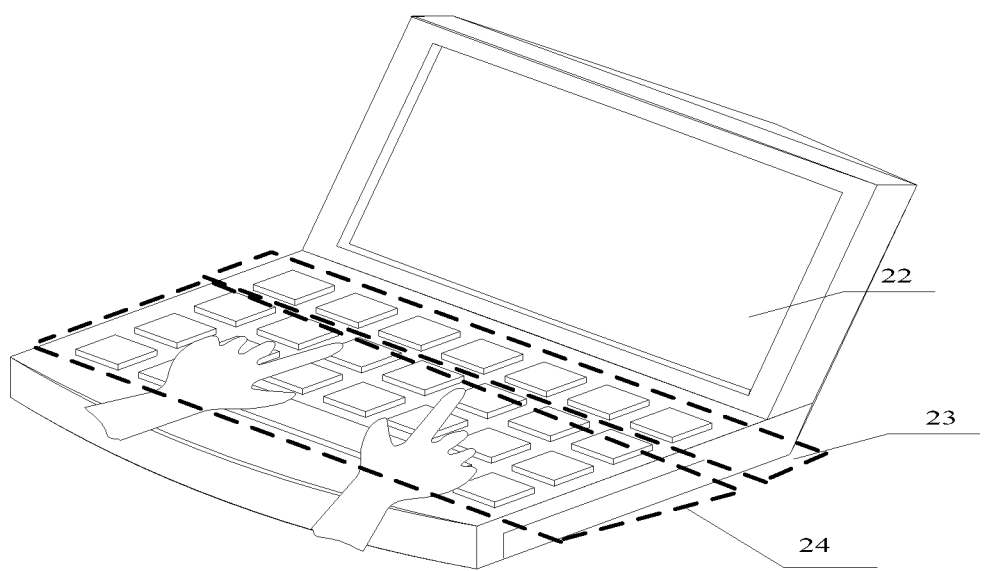
FIG. 2 illustrates a schematic diagram of an example of an implementation manner for disposing a radiation portion in an electronic device consistent with some embodiments of the present disclosure.

The electronic device may include a first main body having a display screen, a second main body having the input device for the display screen, and a connection device coupled to the first main body and the second main body for enabling the first main body to be movable with respect to the second main body. Referring to FIG. 2, a first surface of the first main body may include a display screen 22, and a second surface of the first main body may include a back cover of the display screen. The antenna in the electronic device, as an example of the radiation portion in the disclosed embodiments of the present disclosure may be disposed in the back cover (not shown) included in the first main body. The first surface may be disposed opposite to the second surface. To ensure that the antenna transmits wireless signals normally, i.e., the antenna is not shielded, the region where the antenna is disposed in the back cover may have to be made of a non-metal material, e.g., a plastic material. Therefore, a portion of the back cover of the display panel 22 may be made of a non-metal material, and another portion thereof may be made of a metal material, for example, at least the material corresponding to the region where the antenna is disposed in the back cover may be made of a non-metal material. The non-metal material disposed in the local region may not only increase the cost of the display screen, but also affect the appearance of the electronic device.

The keyboard may be a key component of the electronic device, and the keyboard may occupy a large area in the electronic device. Referring to FIG. 2, the keyboard may occupy a substantially large area in the notebook computer. The disposure of the antenna in a large-area keyboard may improve the performance of the antenna. Moreover, the plastic material may not desire to be disposed in the local region of the display screen, which may not increase the cost of the display screen, and may not affect the appearance of the electronic device. In some embodiments, an all-metal back cover may be achieved for the display screen, which may reduce the difficulty for forming the back cover of the display screen and the difficulty for processing the back cover.

For the keyboard having a different structure, the force-receiving portion 11, the moving portion 12, and the trigger portion 13 each may have a different structure. For illustrative purposes, two types of keyboards are used as an example to describe the structure of the above-described keyboard in following. The disclosed embodiments of the present disclosure provide, but are not limited to, the following two types.

Figure 3:
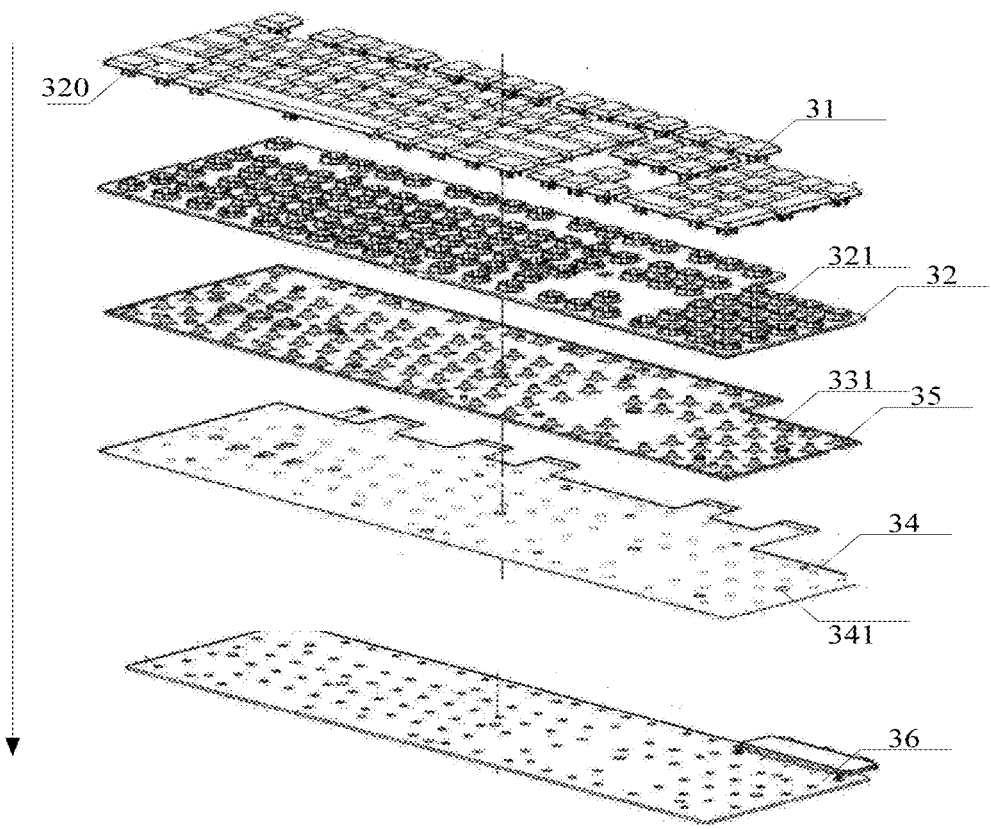
FIG. 3 illustrates a schematic diagram of an example of a keyboard consistent with some embodiments of the present disclosure.

FIG. 3 illustrates a schematic diagram of an example of a keyboard consistent with some embodiments of the present disclosure. In a first example, referring to FIG. 3, the keyboard may include a plurality of keycaps 31, a connecting element 32 corresponding to each keycap 31, and a conductive film 34. One keycap may be one force-receiving portion 11, one connecting element 32 may correspond to one moving portion 12, and one conductive film 34 may be one trigger portion 13.

In some embodiments, one connecting element 32 may include a key post 320 corresponding to the keycap 31, and a guide seat 321 corresponding to the key post. In some embodiments, the keycap 31 may be coupled to an upper end of the key post 320. One keycap 31 may correspond to one guide seat 321. The key post 320 corresponding to the keycap 31 may cooperate with the corresponding guide seat 321 to enable the keycap 31 to utilize the key post 320 and the guide seat 321 to move up and down.

In some embodiments, each keycap 31 may correspond to an elastic body. For example, the above-described keyboard may further include an elastic film 35. The elastic film 35 may be provided with a plurality of elastic bodies 331. In some embodiments, one connecting element 32 may include one key post 320, a guide seat 321 cooperated with the key post 320, and a corresponding elastic body 331. One elastic body 331 may correspond to one keycap. A bottom of the key post 320 corresponding to a keycap 31 may touch the corresponding elastic body 331. In response to the keycap 31 being pressed, the corresponding elastic body 331 may be triggered.

In some embodiments, the conductive film 34 may include a plurality of membrane switches 341. After the operation object touches the keycap 31, the connecting element 32 may change from an opened state to a folded state, and the elastic body 331 may follow the downward movement of the keycap 31 as well as the connecting element 32 to move. Therefore, the elastic body 331 may trigger the corresponding membrane switch 341 in the conductive film 34 to be electrically conductive, and to transmit a button signal corresponding to the keycap 31 to the electronic device.

In some embodiments, the membrane switch 341 may include an upper contact point and a lower contact point, and a set of an upper contact point and a corresponding lower contact point may form the membrane switch. In response to the upper contact point of the membrane switch being connected to the lower contact point thereof, the membrane switch may be electrically conductive.

In some embodiments, the keyboard may further include a keyboard circuit board 36. In some embodiments, the button signal may be transmitted to the keyboard circuit board 36. The keyboard circuit board 36 may perform signal processing on the button signal to convert the button signal to a digital signal readable by the electronic device.

Figure 4:
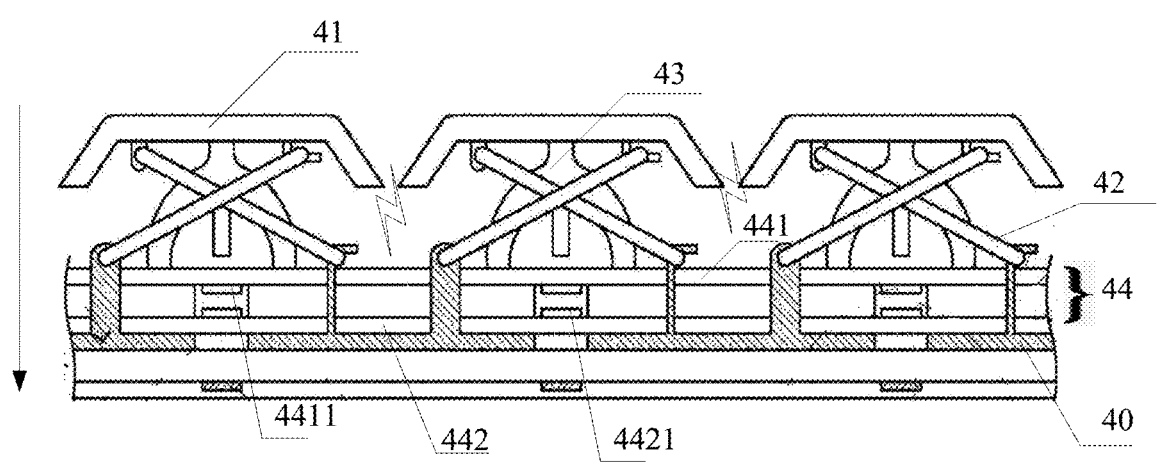
FIG. 4 illustrates a schematic diagram of another example of a keyboard consistent with some embodiments of the present disclosure.

FIG. 4 illustrates a schematic diagram of another example of a keyboard consistent with some embodiments of the present disclosure. In a second example, referring to FIG. 4, the keyboard may successively include a plurality of keycaps 41, a connecting element 42 corresponding to each keycap 41, a film circuit board 44, and a keyboard circuit board (not illustrated) from top to bottom. One keycap 41 may be one force-receiving portion 11, one connecting element 42 may be a moving portion 12, and one thin film circuit board 44 may be a trigger portion 13.

In some embodiments, the keyboard may further include a supporting portion 40.

In some embodiments, the connecting element 42 may be disposed in front of the supporting portion 40 as well as the keycap 41, such that the keycap 41 may move up and down with respect to the supporting portion 40.

In some embodiments, the connecting element 42 may include a scissor-type connecting element as illustrated in FIG. 4. In some embodiments, the connecting element 42 may also include an elastic body 43.

In some embodiments, the film circuit board 44 may include a first layer circuit board 441 and a second layer circuit board 442. The first layer circuit board may be disposed with a plurality of upper contact points 4411, and the second layer circuit board may be disposed with a plurality of lower contact points 4421. One upper contact point may correspond to one lower contact point, and one upper contact point and one lower contact point may form a membrane switch.

In response to pressing the keycap 41 by a user, the scissor-type connecting element in the connecting element 42 corresponding to the keycap 41 may change from an opened state to a folded state. The downwardly moved keycap 41 may press the corresponding elastic body 43, and the elastic body 43 may touch the film circuit board 44, such that the corresponding membrane switch may be electrically conductive to enable the film circuit board 44 to generate a corresponding button signal. In some embodiments, the button signal may be transmitted to the keyboard circuit board. The keyboard circuit board may perform signal processing on the button signal to convert the button signal to a digital signal readable by the electronic device. In response to not pressing the keycap 41 by a user, the keycap 41 may move upward with respect to the film circuit board 44 in response to the elastic force of the elastic body 43. In view of this, the connecting element 42 may change from the folded state to the opened state, and the keycap 41 may be restored to the original position.

FIGS. 3-4 provide two types of keyboards. The functions and structures of the force-receiving portion 11, the moving portion 12, and the trigger portion 13 included in the input device are described by using the keyboard as an example, the input device is however not limited to the keyboard. The input device may include any other device, e.g., a mouse, etc. Even in response to the input device being a keyboard, the structure of the keyboard provided by the disclosed embodiment of the present disclosure is not limited to the above two structures.

In the disclosed embodiments of the present disclosure, the radiation portion 14a or 14b may be disposed in following positions of the input device. The disclosed embodiments of the present disclosure provide, but are not limited to the following positions.

In a first example, each force-receiving portion 11 may include a second force-receiving surface, and the radiation portion 14a or 14b may be disposed between the second force-receiving surface of the force-receiving portion 11 and the trigger portion 13. The second force-receiving surface may refer to an upper surface of the force-receiving portion 11. The direction indicated by the arrow in FIG. 1 may be a top-to-bottom direction.

In some embodiments, the radiation portion 14a or 14b may transmit or receive signal primarily in a direction opposite to the arrow in one of FIG. 1, FIG. 3, and FIG. 4. The less the devices that block the radiation portion 14a or 14b, the stronger the intensity of the signal transmitted or received by the radiation portion 14a or 14b. To prevent the signal transmitted or received by the radiation portion 14a or 14b from being blocked, the radiation portion 14a or 14b may be disposed between the second force-receiving surface of the force-receiving portion 11 and the trigger portion 13.

Taking FIG. 1 as an example, the radiation portion 14a or 14b may be disposed between the force-receiving portion 11 and the moving portion 12. Alternatively, the radiation portion 14a or 14b may be disposed between the moving portion 12 and the trigger portion 13.

Taking FIG. 3 as an example, the radiation portion 14a or 14b may be disposed between the keycap 31 and a bracket carrying the plurality of guide seats. Alternatively, the radiation portion 14a or 14b may be disposed between the bracket carrying the guide seats and the elastic film. Alternatively, the radiation portion 14a or 14b may be disposed between the elastic film and the conductive film.

Taking FIG. 4 as an example, the radiation portion 14a or 14b may be disposed between the keycap 41 and the film circuit board 44.

In some embodiments, each force-receiving portion 11 may be located at one side of the moving portion 12, and the radiation portion 14a or 14b may be disposed in at least a local region of a first force-receiving surface of the force-receiving portion 11. The first force-receiving surface may refer to a surface of the force-receiving portion 11 close to the moving portion 12.

In response to the radiation portion 14a or 14b being disposed in at least a local region of the first force-receiving surface of the force-receiving portion 11, the radiation portion 14a or 14b may be merely blocked by the force-receiving portion. In other words, the signal transmitted or received by the radiation portion 14a or 14b may not be blocked by the moving portion 12 and the trigger portion 13. Therefore, the signal transmitted or received by the radiation portion 14a or 14b may be effectively received by a peer device, e.g., end-to-end device, in communication with the input device.

The larger the area of the first force-receiving surface of the force-receiving portion 11, the better the overall performance of the radiation portion 14a or 14b.

The larger the area for disposing the radiation portion, the larger the quantity of microstrip lines included in the radiation portion. Because different microstrip line has a different length, signal transmitted or received by the microstrip line with a different length may have a different communication frequency, such that the microstrip lines may be capable of transmitting or receiving a plurality of signals with different communication frequencies.

For the radiation portion having a same quantity of microstrip lines, the larger the area for disposing the radiation portion, the larger the distance between the microstrip lines, such that the signals transmitted or received by the microstrip lines may not interfere with each other.

For the radiation portion having a same quantity of microstrip lines, the larger the area for disposing the radiation portion, the two or more microstrip lines that desire strong coupling may be laid out in an optimal manner, such that the coupling between the two or more microstrip lines may be substantially strong.

Taking FIG. 1 as an example, the radiation portion 14a or 14b may be disposed in at least a local region of a lower surface of the force-receiving portion 11. The direction indicated by the arrow in FIG. 1 may be the top-to-bottom direction.

Taking FIG. 3 as an example, the radiation portion 14a or 14b may be disposed in at least a local region of the lower surface of the keycap 31. The direction indicated by the arrow in FIG. 3 may be the top-to-bottom direction.

Taking FIG. 4 as an example, the radiation portion 14a or 14b may be disposed in at least a local region of the lower surface of the keycap 41. The direction indicated by the arrow in FIG. 4 may be the top-to-bottom direction.

In some embodiments, each force-receiving portion 11 may be located at one side of the moving portion 12, and each radiation portion 14a or 14b may be disposed on at least a local region of the second surface of the moving portion 12. The second surface may refer to the surface of the moving portion 12 close to the force-receiving portion 11.

Taking FIG. 1 as an example, the radiation portion 14a or 14b may be disposed on the upper surface of the moving portion 12. The direction indicated by the arrow in FIG. 1 may be the top-to-bottom direction.

Taking FIG. 3 as an example, the radiation portion 14a or 14b may be disposed on the upper surface of the connecting element 32. The direction indicated by the arrow in FIG. 3 may be the top-to-bottom direction. Alternatively, the radiation portion 14a or 14b may be disposed on the upper surface of the guide seat 321 cooperated with the key post 320. The direction indicated by the arrow in FIG. 3 may be the top-to-bottom direction.

In a second example, each moving portion 12 may be disposed on a side of the trigger portion 13, and the radiation portion 14a or 14b may be disposed on an opposite side of the trigger portion 13.

In response to the radiation portion 14a or 14b being disposed on the opposite side of the trigger portion 13, the radiation portion 14a or 14b may be less affected by the pressure of the operation object 10. Because the opposite side of the trigger portion 13 is not disposed with the moving portion 12 as well as the force-receiving portion 11, the opposite side of the trigger portion 13 may have a substantially large area for disposing the radiation portion, thereby improving the overall performance of the radiation portion.

In some embodiments, the input device may further include a supporting portion. The input device may be a keyboard as an example, the supporting portion may be a supporting portion 40 illustrated in FIG. 4. The supporting portion may be configured to fix each force-receiving portion. Referring to FIG. 4, the supporting portion 40 may fix the scissor-type connecting element included in the connecting element. In some embodiments, the input device may further include a bottom cover.

In some embodiments, the radiation portion 14a or 14b may be disposed between the trigger portion 13 and the supporting portion. Alternatively, the radiation portion 14a or 14b may be disposed between the supporting portion and the bottom cover.

In response to the radiation portion 14a or 14b being disposed between the supporting portion and the bottom cover, in some embodiments, the supporting portion may be provided with a plurality of through-holes, the trigger portion may be disposed on one side of the supporting portion, and the radiation portion may be disposed on the other side of the supporting portion. In view of this, the radiation portion may transmit or receive the wireless signal through through-holes on the supporting portion, thereby preventing the radiation portion from being shielded.

In some embodiments, the supporting portion may be a metal supporting portion. Alternatively, the supporting portion may be a non-metal supporting portion. In response to the supporting portion being a metal supporting portion, the strength of the input device may increase.

In response to the supporting portion being a metal supporting portion and the metal supporting portion not being provided with through-holes, to prevent the radiation portion from being shielded, the radiation portion may be disposed between the trigger portion 13 and the supporting portion.

Taking FIG. 1 as an example, the radiation portion 14a or 14b may be disposed on the opposite side of the trigger portion 13.

Taking FIG. 3 as an example, the radiation portion 14a or 14b may be disposed between the conductive film 34 and the keyboard circuit board 36. Alternatively, the radiation portion 14a or 14b may be disposed under the keyboard circuit board 36. The direction indicated by the arrow in FIG. 3 may be the top-to-bottom direction.

The keyboard illustrated in FIG. 3 may also include a bottom cover. In some embodiments, the radiation portion 14a or 14b may be disposed between the keyboard circuit board 36 and the bottom cover.

In some embodiments, the keyboard shown in FIG. 3 may further be provided with a light-transmitting component between the keyboard circuit board 36 and the bottom cover. In some embodiments, the radiation portion 14a or 14b may be disposed between the keyboard circuit board 36 and the light-transmitting component. Alternatively, the radiation portion 14a or 14b may be disposed between the light transmitting component and the bottom cover.

Taking FIG. 4 as an example, the radiation portion 14a or 14b may be disposed between the film circuit board 44 and the supporting portion 40.

In some embodiments, the keyboard illustrated in FIG. 4 may further include a bottom cover. In some embodiments, the radiation portion 14a or 14b may be disposed between the supporting portion 40 and the bottom cover.

In the above-described first and second examples of layouts of the radiation portion may be based on a vertical direction. In following embodiments, the layouts of the radiation portion may be based on a horizontal direction. The above-described first and second examples of layouts of the radiation portion may be arbitrarily combined with the following embodiments, and the following embodiments may be combined arbitrarily.

In a third example, the one or more force-receiving portions 11 may include two or more force-receiving portions, and the radiation portion 14a or 14b may be disposed on the force-receiving portion having the largest size among the two or more force-receiving portions.

In response to the signals desired to be transmitted and received by the radiation portion 14a or 14b having a fixed communication frequency, the microstrip lines included in the radiation portion 14a or 14b may have a fixed length. In response to the radiation portion 14a or 14b being disposed on the first force-receiving surface of the force-receiving portion and the force-receiving portion having a substantially small size, the microstrip lines included in the radiation portion 14a or 14b, e.g., the antenna, may have to be folded and arranged on the force-receiving portion, causing the signals transmitted or received by the microstrip lines in the folded portion to interfere with each other. In other words, the smaller the size of the force-receiving portion 11, the easier the occurrence of the interference between the signals transmitted or received by the radiation portion 14a or 14b. In view of this, in some embodiments, the radiation portion 14a or 14b may be disposed on the force-receiving portion having the largest size among the two or more force-receiving portions. In other words, the disposure of the radiation portion 14a or 14b on the force-receiving portion having the largest size among the two or more force-receiving portions may enable the microstrip lines included in the radiation portion 14a or 14b to be arranged in an optimum manner.

Similarly, in response to the signals desired to be transmitted or received by the radiation portion 14a or 14b having a plurality of communication frequencies, the disposure of the radiation portion 14a or 14b on the force-receiving portion having the largest size among the two or more force-receiving portions may enable the microstrip lines included in the radiation portion 14a or 14b to be arranged in an optimum manner.

The microstrip lines included in the radiation portion 14a or 14b may be optimally arranged. In other words, for the microstrip lines which may cause interference, the distance between the microstrip lines may be laid out substantially large, such that the signals transmitted or received by the microstrip lines may not interfere with each other. For the two or more microstrip lines that desire strong coupling, the distance between the microstrip lines may be laid out substantially small, such that the coupling between the two or more microstrip lines may be substantially strong.

In some embodiments, the maximum size may include one or more of the largest area of the first force-receiving surface of the force-receiving portion, and the longest length of the first force-receiving surface of the force-receiving portion.

Figure 5:
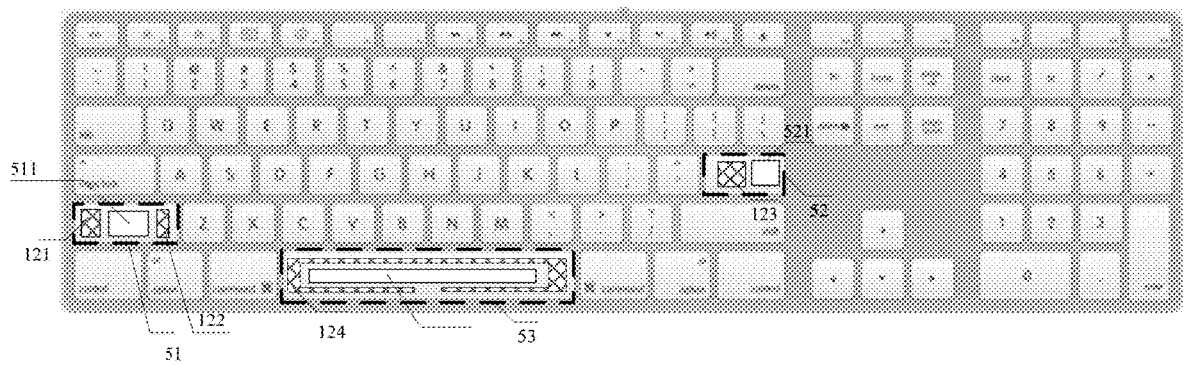
FIG. 5 illustrates a schematic diagram of an example of force-receiving portions in a keyboard consistent with some embodiments of the present disclosure.

FIG. 5 illustrates a schematic diagram of an example of force-receiving portions in a keyboard consistent with some embodiments of the present disclosure. The force-receiving portion 11 of the keyboard illustrated in FIG. 5 may include two or more force-receiving portions. Taking the force-receiving portion 11 including a force-receiving portion 51, a force-receiving portion 52, and a force-receiving portion 53 as an example, because the force-receiving portion 53 has the largest size, the radiation portion 14a or 14b may be disposed on a first force-receiving surface of the force-receiving portion 53.

In a fourth example, one or more force-receiving portions 11 may include two or more force-receiving portions. The radiation portion 14a or 14b may be disposed on a force-receiving portion that satisfies the following condition: the area ratio of the contact region where the moving portion 12 is in contact with the first force-receiving surface of the force-receiving portion is less than or equal to a first threshold value. The area ratio may refer to a ratio of the area of the contact region where the moving portion 12 is in contact with the first force-receiving surface of the force-receiving portion over the area of the first force-receiving surface of the force-receiving portion. The first force-receiving surface may refer to a surface of the force-receiving portion that is close to the moving portion.

For any one force-receiving portion, there may be a corresponding moving portion. There may be a contact region between the first force-receiving surface of the force-receiving portion and the moving portion 12. In response to the ratio of the area of the contact region over the area of the first force-receiving surface of the force-receiving portion being less than or equal to the first threshold value, the area of the first force-receiving surface may be substantially large, and then the radiation portion 14a or 14b may be disposed on the force-receiving portion.

In some embodiments, one force-receiving portion may correspond to one or more moving portions. Based on a quantity of moving portions corresponding to one force-receiving portion, the disposure location of the radiation portion 14a or 14b on the force-receiving portion may be described in following.

First, in response to one force-receiving portion corresponding to one moving portion and the area ratio of the contact region between the moving portion and the first force-receiving surface of the force-receiving portion being smaller than the first threshold value, the radiation portion 14a or 14b may be disposed on any other region except for the contact region between the moving portion and the first force-receiving surface of the force-receiving portion.

In the process of touching the force-receiving portion by the operation object, in response to the radiation portion 14a or 14b being disposed in a region where the force-receiving portion is in contact with the moving portion, because the radiation portion is squeezed in response to touching the force-receiving portion by the operation object each time, the radiation portion may be easily damaged. In view of this, in some embodiments, the radiation portion 14a or 14b may be disposed in a region of the first force-receiving surface of the force-receiving portion that is not in contact with the moving portion.

In some embodiments, in response to the moving portion being in contact with a central region of the first force-receiving surface of the force-receiving portion, the radiation portion 14a or 14b may be disposed in a surrounding region of the first force-receiving surface of the force-receiving portion except for the center region.

Referring to FIG. 5, the force-receiving portion having a "capslock" mark is taken as an example for illustrative purposes. Because FIG. 5 involves a plurality of force-receiving portions and a plurality of moving portions, reference numeral other than "11" is used in FIG. 5 to distinguish. In response to the force-receiving portion 52 corresponding to one moving portion, the contact region between the moving portion and the first force-receiving surface of the force-receiving portion 52 may refer to a square region 123 filled with the mesh as illustrated in FIG. 5. In response to the area ratio of the square region 123 being less than the first threshold value, the radiation portion 14a or 14b may be disposed on the force-receiving portion 52. In some embodiments, the radiation portion 14a or 14b may be disposed in any other region of the first force-receiving surface of the force-receiving portion 52 except for the square region 123, e.g., a region 521 in the first force-receiving surface.

Second, in response to one force-receiving portion corresponding to two or more moving portions, each moving portion may have a contact region with the first force-receiving surface of the force-receiving portion, respectively. In other words, there may be two or more contact regions between the two or more moving portions and the force-receiving portion. In response to there being a certain gap between the two or more moving portions, there may be a certain gap between the two or more contact regions of the two or more moving portions and the first force-receiving surface of the force-receiving portion. In response to the ratio of a sum of the areas of the two or more contact regions over the area of the first force-receiving surface of the force-receiving portion being less than or equal to the first threshold value, the radiation portion 14a or 14b may be disposed in any other region of the first force-receiving surface of the force-receiving portion except for the contact regions. For example, the radiation portion 14a or 14b may be disposed in a gap between the two or more contact regions.

Referring to FIG. 5, in response to the force-receiving portion 51 corresponding to two moving portions, the contact regions between the two moving portions and the first force-receiving surface of the force-receiving portion 51 may include square regions 121 and 122 filled with a mesh lattice as illustrated in FIG. 5. Referring to FIG. 5, in response to the ratio of a sum of the areas of the square regions 121 and 122 over the area of the first force-receiving surface of the force-receiving portion 51 being less than or equal to the first threshold value, the radiation portion 14a or 14b may be disposed on the force-receiving portion 51. In some embodiments, the radiation portion 14a or 14b may be disposed in any other region of the first force-receiving surface of the force-receiving portion 51 except for the square regions 121 and 122, e.g., a region 511 in the first force-receiving surface.

Third, one force-receiving portion may correspond to one or more moving portions. In response to a ratio of a sum of areas of contact regions between the one or more moving portions and the first force-receiving surface of the force-receiving portion over an area of the first force-receiving surface of the force-receiving portion being less than or equal to the first threshold value, the radiation portion may be disposed on the first force-receiving surface of the force-receiving portion.

In some embodiments, in response to there being a certain accommodation space between the contact regions of the moving portion and the first force-receiving surface of the force-receiving portion, the radiation portion may be disposed in the accommodation space.

Referring to FIG. 5, in response to one force-receiving portion 53 corresponding to one moving portion, the position of the contact region of the moving portion and the first force-receiving surface of the force-receiving portion 53 may refer to a region 124 surrounded by the mesh square as illustrated in FIG. 5. In response to the ratio of the area of the region 124 over the area of the first force-receiving surface of the force-receiving portion 53 being less than or equal to the first threshold value, the radiation portion 14a or 14b may be disposed on the force-receiving portion 53.

In response to there being an accommodation space in the contact region 124 of the moving portion and the first force-receiving surface of the force-receiving portion 53, e.g., an accommodation space 531, the radiation portion 14a or 14b may be disposed in the accommodation space 531.

In some embodiments, the moving portion may have a different shape, and the accommodating space may have a different shape. In response to the moving portion having a groove shape, i.e., a recessed middle and raised surroundings, the accommodating space 531 as illustrated in FIG. 5 may be formed.

In some embodiments, a different first threshold value may be determined according to practical applications, which is not limited by the present disclosure.

In a fifth example, the one or more force-receiving portion 11 may include two or more force-receiving portions, there may be a spacing between the trigger portions 13 respectively corresponding to the two or more force-receiving portions, and the radiation portion 14a or 14b may transmit or receive wireless signals at least using the spacing.

In some embodiments, to prevent the wireless signals received or transmitted by the radiation portion 14a or 14b from being affected, a non-metal material, e.g., a plastic material, may be disposed in the vicinity of the radiation portion 14a or 14b, which may result in an increase in cost.

In some embodiments, to avoid an increase in cost, the spacing between the trigger portions 13 respectively corresponding to the two force-receiving portions 11 may be used to transmit or receive wireless signals. In view of this, the non-metal material may not be disposed in the vicinity of the radiation portion 14a or 14b. In some embodiments, because the wireless signals are transmitted or received by using the spacing between the plurality of trigger portions, the force-receiving portion 11 may be partially or entirely made of a metal material. In some embodiments, the force-receiving portion 11 may be partially or entirely made of a non-metal material.

In response to the force-receiving portion 11 being partially or entirely made of a metal material, the strength of the input device may increase.

Referring to FIG. 1, the input device may include two or more force-receiving portions 11, and each one force-receiving portion 11 may correspond to one trigger portion 13. In some embodiments, there may be a spacing between adjacent two trigger portions 13, and the radiation portion 14a or 14b may transmit or receive wireless signals by using the spacing.

Taking FIG. 4 as an example, the utilization of the spacing for transmitting or receiving the wireless signal may reduce the loss of the wireless signal. The wireless signal is represented by a lightning symbol.

In a sixth example, the radiation portion 14a or 14b may be locally or globally disposed. The local disposure may refer to that the radiation portion is located in a local region of the input device, and the global distribution may refer to that the radiation portion is covered with the entire input device.

In response to performing an input on the input device by the operation object 10, the operation object 10 may affect the radiation portion 14a or 14b. For example, the operation object 10 may block a local region of the input device. In one embodiment, in response to the input device being a keyboard and tapping the keyboard by the user, the user's hand may block part of the keyboard. In response to the input device being a mouse and the user holding the mouse, the user's hand may block part of the mouse. In response to the human body blocking at least a partial region of the radiation portion 14a or 14b, the intensity of the signal transmitted or received by the radiation portion 14a or 14b may be affected.

Therefore, the radiation portion 14a or 14b may be disposed in a local region of the input device. In some embodiments, the radiation portion may be disposed in the local region of the input device that is not blocked by the human body or blocked with less frequent frequency.

The input device as a keyboard is used as an example for detailed description in following. In one embodiment, the "one or more force-receiving portions" described in the above embodiments may include two or more force-receiving portions, and the radiation portion may be locally disposed on the corresponding two or more force-receiving portions. One or more force-receiving portions among the two or more force-receiving portions may be located in a first region; and one or more force-receiving portions among the two or more force-receiving portions may be located in a second region. The second region may be a region where the user's hand is placed in response to performing an input on the input device by the user; and the first region may be a region where the user's hand is not placed in response to performing an input on the input device by the user.

In some embodiments, the radiation portion may be disposed in the first region. Referring to FIG. 2, the first region may be a region 23, and the second region may be a region 24.

In response to performing an input on the input device by the operation object 10, the frequency at which the operation object 10 touches each force-receiving portion may be different. For example, some of the force-receiving portions may have a substantially large touch frequency, which are referred to as force-receiving portions with a substantially high use frequency. Some of the force-receiving portions may have a substantially small touch frequency, which are referred to as force-receiving portions with a substantially small use frequency. The frequent frequency at which the force-receiving portions with a substantially large touch frequency are blocked may be substantially large. In some embodiments, the radiation portion may be disposed in a region where the force-receiving portion with a use frequency less than or equal to a first preset frequency is located.

The first preset frequency may be determined according to practical applications.

In some embodiments, the input device as a keyboard is used as an example for illustrative purposes. The keyboard may include 26 letters, and/or 10 numbers, and/or punctuation. Among the 26 letters, and/or 10 numbers, and/or punctuation, one of 'e', 'h' and 'k' may be used at the highest frequency, and one of 'Z', 'Q', 'X' and '1' may be used at the lowest frequency. Then, the radiation portion may be disposed in a region where one of 'Z', 'Q', 'J', 'X' and '1' character is located.

In a seventh example, one or more force-receiving portions among the two or more force-receiving portions may correspond to a character input region. After the force-receiving portion in the character input region receives a force, the trigger portion may generate a character input. One or more force-receiving portions among the two or more force-receiving portions may belong to a function input region. After the force-receiving portion in the function input region receives a force, the trigger portion may generate a function input. The radiation portion may be located in the function input region.

In general, the force-receiving portion included in the function input region may have a substantially low use frequency. The radiation portion may be disposed in the function input region, such that the influence on the radiation portion may be substantially small.

Figure 6:
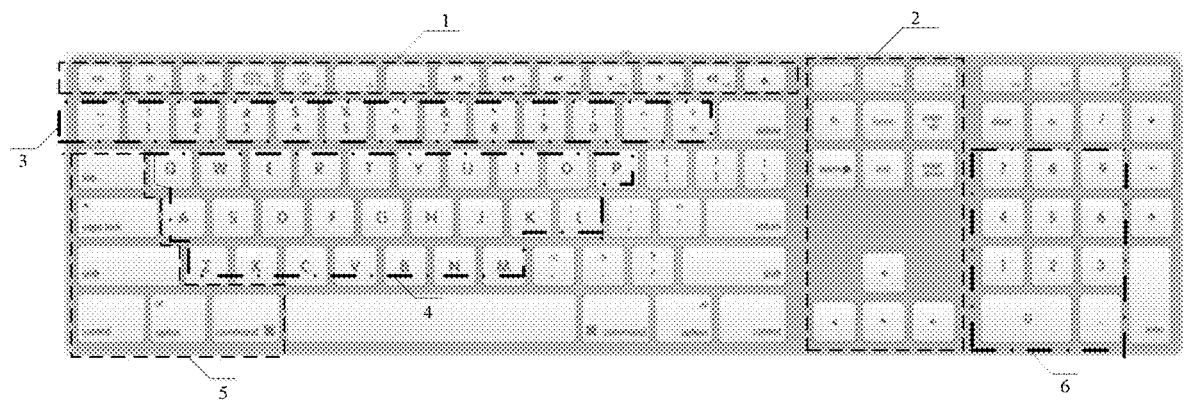
FIG. 6 illustrates a schematic diagram of an example of a presentation of a character input region and a function input region of a keyboard consistent with some embodiments of the present disclosure.

FIG. 6 illustrates a schematic diagram of an example of a presentation of a character input region and a function input region of a keyboard consistent with some embodiments of the present disclosure.

In some embodiments, the function input region may include one or more of a region 1, a region 2, and a region 5 that are enclosed by a broken line as illustrated in FIG. 6. In response to clicking the force-receiving portion in the function input region, the trigger portion may generate a function input, e.g., a full screen display.

The character input region may include one or more of a region 3, a region 4, and a region 6 that are enclosed by a dotted line as illustrated in FIG. 6. In response to clicking the force-receiving portion in the character input region, the trigger portion may generate a character input, e.g., an input of a character "A".

There are many types of presentation forms of characters in the keyboard, and FIG. 6 merely illustrates one of them. The layout of the characters in the keyboard illustrated in FIG. 6 may not limit the layout of characters in the keyboard provided in the disclosed embodiments of the present disclosure. For example, characters in the keyboard may also have a layout as illustrated in FIG. 7.

Figure 7:
FIG. 7 illustrates a schematic diagram of another example of a presentation of a character input region and a function input region of a keyboard consistent with some embodiments of the present disclosure.

In some embodiments, the function input region may include one of a region 7 and a region 9 that are enclosed by a broken line as illustrated in FIG. 7.

In some embodiments, the character input region may include a region 8 enclosed by a dotted line as illustrated in FIG. 7.

The character input region may be a region frequently used by the user, i.e., the region where the force-receiving portions with a substantially high use frequency are located.

The function input region may be the region not frequently used by the user, i.e., the region where the force-receiving portions with a substantially low use frequency are located. The disposure of the radiation portion 14a or 14b in the function input region rather than in the character input region may include the following beneficial features. The human body may not block the radiation portion from transmitting or receiving signals. The radiation portion 14a or 14b may be less affected by the operation object's touch by being disposed in a region that is not frequently used.

In some embodiments, the radiation portion may be disposed in the character input region.

In the disclosed embodiments of the present disclosure, the second force-receiving surface of each force-receiving portion may be provided with a mark. The second force-receiving surface may be located at a first end of the input device, and the mark may have a forward direction. The radiation portion may be disposed at a second end of the input device. A direction from the first end of the input device to the second end thereof may be same as the forward direction. The direction of the arrow illustrated in one of FIG. 3 and FIG. 4 may be the forward direction.

In some embodiments, the mark on the second force-receiving surface may be a character mark on the keycap, as illustrated in FIG. 6 and FIG. 7, and details are not described herein.

Further, the direction from the first end to the second end may be one of the direction of the arrow illustrated in FIG. 3 and the direction of the arrow illustrated in FIG. 4.

Accordingly, the input device in the disclosed embodiments of the present disclosure may be provided with a non-metal material in the vicinity of the radiation portion, such that the radiation portion may not be shielded. Alternatively, by using the structure of the input device itself, e.g., the force-receiving portion with the largest size among the two force-receiving portions, the spacing between the trigger portions respectively corresponding to the two force-receiving portions, or the through-holes disposed on the supporting portion, to transmit or receive wireless signals, the radiation portion may not be shielded even a non-metal material is not disposed in the vicinity of the radiation portion.

In the above-described sixth and seventh examples of layout types of the radiation portion 14a or 14b, to reduce the influence on the intensity of the signals transmitted or received by the radiation portion 14a or 14b due to the block of the radiation portion 14a or 14b disposed on the input device by the operation object 10, the radiation portion 14a or 14b may be disposed in the region where the operation object operates less frequently as much as possible. However, for each force-receiving portion of the input device, the operation object 10 may operate at a certain probability. For a different user, the region where the operation object operates less frequently in the input device may be different. For example, for some users, the region where the operation object operates less frequently may be the character input region; and for some users, the region where the operation object operates less frequently may be the function input region. Alternatively, for different stages of a same user, the region where the operation object operates less frequently in the input device may be different. The disposure of the radiation portion 14a or 14b in a certain region of the input device in a "static" manner may not satisfy the requirements of each user for the intensity of the signals transmitted or received by the radiation portion. For example, for the same user, sometimes the region where the operation object operates less frequently may be the function input region, and sometimes the region where the operation object operates less frequently may be the character input region.

Therefore, the disclosed embodiments of the present disclosure further provides a technical solution for "dynamically" switching the radiation portion 14a or 14b, which is described in the following.

The disclosed embodiments of the present disclosure may include a plurality of radiation portions 14a or 14b. Each radiation portion 14a or 14b may be laid out in accordance with one or more of the above-described first to seventh examples.

In the disclosed embodiments of the present disclosure, an object that transmits or receives signals to/from the radiation portion 14a or 14b may be referred to as a peer device. At a same moment, one or more radiation portions 14a or 14b may communicate with the peer device. The one or more radiation portions 14a or 14b may be referred to as a set of radiation portions. Different set of radiation portions may include one or more different radiation portions.

In some embodiments, one or more radiation portions in different sets of radiation portions may be disposed in a different region of the input device. In a process of communicating with the peer device, the set of radiation portions that communicates with the peer device may be switched. For example, in some embodiments, the set of radiation portions that communicates with the peer device may be switched based on the intensity of the signal strength of the signal transmitted or received by each set of radiation portions.

Figure 8:
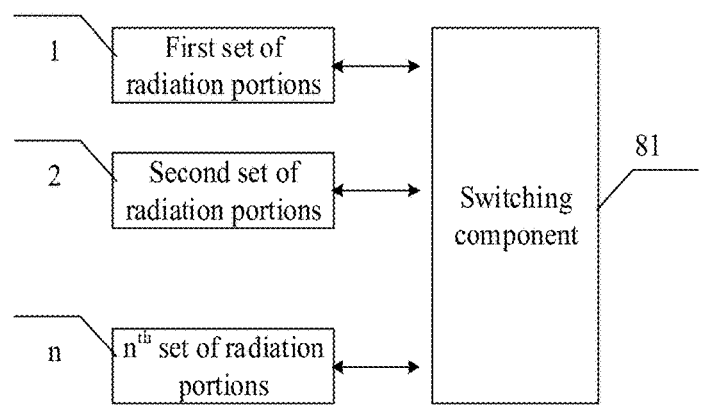
FIG. 8 illustrates a schematic diagram of an example of sets of radiation portions and a switching component consistent with some embodiments of the present disclosure.

FIG. 8 illustrates a schematic diagram of an example of sets of radiation portions and a switching component consistent with some embodiments of the present disclosure. In some embodiments, referring to FIG. 8, the input device in the disclosed embodiments of the present disclosure may further include a switching component 81. The switching component 81 may be configured to switch a first set of radiation portions that communicates with the peer device to a second set of radiation portions in response to the trigger condition being satisfied. The first set of radiation portions and the second set of radiation portions may be any two different sets of radiation portions in 1–n (n is a positive integer greater than or equal to 2) sets of radiation portions as illustrated in FIG. 8.

In some embodiments, at a different moment, the set of radiation portions that communicates with the peer device and is switched by the switching component 81 may be different. The trigger condition may be described below.

In some embodiments, the trigger condition may include one or more of the followings.

In a first example, during the process of communication between the first set of radiation portions and the peer device, in response to the signal strength of the signal sent by the peer device and received by the first set of radiation portions being lower than a first threshold value, the trigger condition may be satisfied.

In some embodiments, in the process of communication between the first set of radiation portions and the peer device, the intensity, e.g., power, of the signal sent by the peer device may be greater than or equal to the intensity that can normally communicate with the set of radiation portions. The signal strength of the signal sent by the peer device may take into account the attenuation of a communication channel between the peer device and the input device. In other words, after the signal strength of the signal sent by the peer device is attenuated by the communication channel, the input device may still receive the signal with undistorted amplitude. In other words, the signal strength of the signal received by the input device may be greater than or equal to the first threshold. The first threshold may be greater than or equal to a minimum signal strength of the signal with undistorted amplitude. In response to the signal strength of the signal received by the first set of radiation portions in the input device and in communication with the peer device being lower than the first threshold value, in some embodiments, at least partial of the first set of radiation portions may be blocked by the operation object 10. Therefore, the switching component 81 may be desired to switch the first set of radiation portions to any other set of radiation portions, e.g., a second set of radiation portions.

In some embodiments, in response to the set of radiation portions not being capable of normally communicating with the peer device due to the block of the operation object 10, the set of radiation portions may desire to be switched. Even the operation object 10 blocks the radiation portion, in response to the set of radiation portions being capable of normally communicating with the peer device, in some embodiments, the set of radiation portions may not be switched. In view of this, the first threshold value may be equal to the minimum signal strength of the signal with undistorted amplitude.

The first threshold value may be determined according to practical applications. In general, in response to a critical value of the signal strength of the signal in normal communication, i.e., the minimum signal strength of the signal with undistorted amplitude, being defined as a target threshold value, the first threshold value may be greater than or equal to the target threshold value.

For example, the signal strength of the signal sent by the peer device may be 50 dB, in general, after being attenuated through the communication channel, the strength of the signal transmitted to the input device may be 30 dB. In response to the signal strength of the signal received by the first set of radiation portions and sent by the peer device being 23 dB, in response to the first threshold value being 25 dB, because 23 dB<25 dB, the trigger condition may be satisfied.

In a second example, during the process of communication between the first set of radiation portions and the peer device, in response to the signal strength of the signal fed back by the peer device and expected to be sent again by the input device being greater than a second threshold value, the trigger condition may be satisfied.

In some embodiments, in the process of communication between the input device and the peer device by using the first set of radiation portions, the signal strength of the signal sent by the first set of radiation portions may be greater than or equal to the signal strength capable of normal communication. In other words, after the signal strength of the signal sent by the first set of radiation portions is attenuated by the communication channel, the peer device may receive the signal with undistorted amplitude. In other words, the signal strength of the signal received by the peer device may be greater than or equal to the second threshold value. The second threshold value may be greater than or equal to the minimum signal strength of the signal with undistorted amplitude.

In response to the signal strength of the signal received by the peer device being smaller than the second threshold value, in some embodiments, because the operation object 10 blocks the first set of radiation portions, the signal strength of the signal may be attenuated, such that the signal strength of the signal received by the peer device may be smaller than the second threshold value. The peer device may consider that the signal strength of the signal sent by the input device is substantially weak, which may cause the signal strength of the signal received by the peer device to be smaller than the second threshold value. Therefore, the peer device may feed back information to the first set of radiation portions, and may expect the first set of radiation portions to send again a signal having a signal strength greater than the second threshold value. Therefore, the first set of radiation portions may desire to be switched to any other set of radiation portions, e.g., a second set of radiation portions, by the switching component 81.

The second threshold value may be determined according to practical applications.

For example, the signal strength of the signal sent by the first set of radiation portions may be 50 dB, and the signal strength may be attenuated by 20 dB through the communication channel. Because the first set of radiation portions may be at least partially blocked by the operation object 10, the signal strength of the signal sent by the first set of radiation portions may be attenuated by 10 dB due to the block of the operation object 10. Ultimately, the signal strength of the signal received by the peer device may be 20 dB. In response to the second threshold value being 25 dB, because 20 dB<25 dB, the peer device may feed back to the input device and expect the signal strength of the signal sent again by the input device to be greater than 25 dB.

In some embodiments, in the above-described two methods satisfying the trigger condition, to switch the first set of radiation portions to the second set of radiation portions, the first set of radiation portions and the second set of radiation portions may have any one of the following relationships.

A signal strength of a signal transmitted or received by one or more first radiation portions in the first set of radiation portions may be smaller than a signal strength of a signal transmitted or received by any one radiation portion in the second set of radiation portions. Alternatively, the signal strength of the signal transmitted or received by one or more first radiation portions in the first set of radiation portions may be smaller than or equal to a third threshold value, and the signal strength of the signal transmitted or received by any one second radiation portion in the second set of radiation portions may be greater than or equal to a fourth threshold value, where the third threshold value may be smaller than the fourth threshold value.

In some embodiments, the signal strength of signal transmitted or received by different radiation portion 14*a* or 14*b* in a same one set of radiation portions may be different. In response to the signal strength of the signal transmitted or received by one or more radiation portions 14*a* or 14*b* in the same one set of radiation portions being substantially low, the communication performance of the input device communicating with the peer device may be affected.

In some embodiments, although the signal strength of the signal transmitted or received by one or more radiation portions in the first set of radiation portions is smaller than the signal strength of the signal transmitted or received by any one radiation portion in the second set of radiation portions, in response to the signal strength of the signal transmitted or received by one or more radiation portions in the first set of radiation portions satisfying normal communication with the peer device, the first set of radiation portions may not be switched to the second set of radiation portions. The third threshold value and the fourth threshold value may be set in view of this.

The third threshold value and the fourth threshold value may be determined according to practical applications.

In some embodiments, in the above-described two methods satisfying the trigger condition, the second set of radiation portions may be any one set of radiation portions included in the input device other than the first set of radiation portions. In other words, the second set of radiation portions may be randomly determined. In response to the second set of radiation portions still satisfying one of the above-described two trigger conditions, the second set of radiation portions may be switched to any one set of radiation portions included in the input device other than the first set of radiation portions as well as the second set of radiation portions until the switched set of radiation portions does not satisfy the trigger condition.

Figure 9:
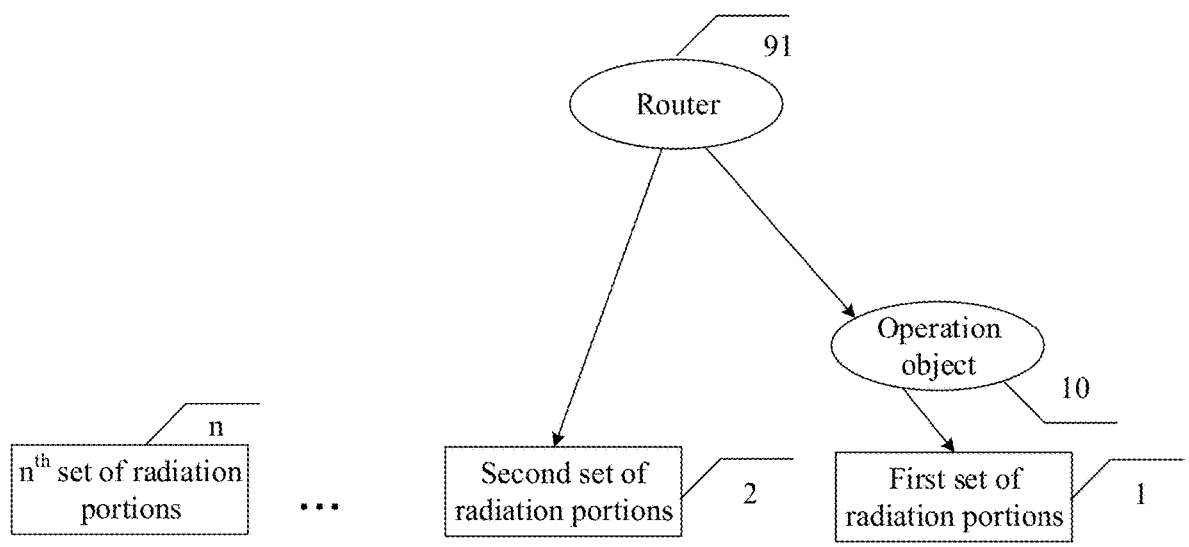
FIG. 9 illustrates a schematic diagram of an example of switching a first set of radiation portions to a second set of radiation portions by a switching component in response to a trigger condition being satisfied consistent with some embodiments of the present disclosure.

FIG. 9 illustrates a schematic diagram of an example of switching a first set of radiation portions to a second set of radiation portions by a switching component in response to satisfying a trigger condition consistent with some embodiments of the present disclosure. To further understand the process of switching from the first set of radiation portions to the second set of radiation portions, referring to FIG. 9, the peer device that communicates with the input device may be a router 91. The set of radiation portions currently communicating with the router 91 may be the first set of radiation portions 1. Then, the router may send a signal to the first set of radiation portions 1, and the first set of radiation portions 1 may send a signal to the router 91. Because the first set of radiation portions 1 is blocked by the operation object 10, the signal strength of the signal transmitted or received by the first set of radiation portions 1 may be attenuated. Therefore, the strength of the signal received by the first set of radiation portions 1 may be smaller than the first threshold value. Alternatively or additionally, the signal strength of the signal expected to be re-sent by the input device, which is fed back by the router 91 and obtained by the input device, may be greater than the second threshold value. In view of this, the first set of radiation portions 1 may be switched to a second set of radiation portions 2 by the switching component. In other words, the communication with the router may be completed by the second set of radiation portions 2.

Referring to FIG. 9, in some embodiments, the second set of radiation portions 2 may not be blocked by the operation object 10.

Accordingly, referring to FIG. 9, the second set of radiation portions may be determined according to the positional relationship between the operation object 10 and the set of radiation portions.

In the process of communication between the set of radiation portions and the peer device, the operation object 10 may be operating the force-receiving portion of the input device. The region of the input device that is blocked by the operation object 10 may be different at a different moment. The region of the input device that is blocked by the operation object 10 may be different, in other words, the set of radiation portions that is blocked may be different, and the set of radiation portions that is affected at a different moment may be different. In view of this, in some embodiments, the given trigger conditions for switching the first set of radiation portions and the second set of radiation portions by the switching component may be described in conjunction with the positional relationship between the operation object 10 and the set of radiation portions.

In a third example, in the process of communication between the first set of radiation portions and the peer device, in response to an area of at least a first local region of the first set of radiation portions blocked by the operation object being larger than an area of a second local region of the second set of radiation portions blocked by the operation object, the trigger condition may be satisfied.

In the process of operating the input device by the operation object 10, because at least a local region of the set of radiation portions is blocked, the signal strength of the signal transmitted or received by the set of radiation portions may be weakened. The larger the region of the set of radiation portions blocked by the operation object 10, the weaker the signal strength of the signal transmitted or received by the set of radiation portions.

In a fourth example, in the process of communication between the first set of radiation portions and the peer device, in response to at least the first local region of the first set of radiation portions being blocked by the operation object and the second set of radiation portions not being blocked by the operation object, the trigger condition may be satisfied.

Accordingly, in some embodiments, whether the trigger condition is satisfied may be determined according to the positional relationship between the operation object 10 and the set of radiation portions.

How to determine the positional relationship between the operation object 10 and the set of radiation portions may be described in following.

In some embodiments, the input device in the disclosed embodiments of the present disclosure may further include a processing component. The processing component may be configured to control one or more sets of radiation-portion arrays to detect the positional relationship between the operation object and the set of radiation portions. A set of radiation-portion arrays may include two or more radiation portions, and signals transmitted or received by each radiation portion included in the set of radiation-portion arrays may be coherently superimposed in a given direction, and transmitted or received signals may cancel each other in any other direction. The given direction corresponding to a different set of radiation-portion arrays may be different.

In some embodiments, two or more radiation portions 14a or 14b included in a set of radiation-portion arrays may implement a radar scanning function by a beamforming principle. In other words, the positional relationship between the operation object 10 and the set of radiation portions may be detected through a beamforming principle.

Further, for any set of radiation-portion arrays, beamforming may refer to by adjusting a phase of a signal transmitted or received by each radiation portion in the set of radiation-portion arrays, obtaining constructive interference of signals in a given direction, and destructive interference of signals in any other direction.

The basic principle of beamforming may be described below with reference to FIGS. 10a-10c. The far field radiation of electromagnetic waves in free space is used as an example. To facilitate understanding beamforming, the basic principle may be described below.

Figure 10A:
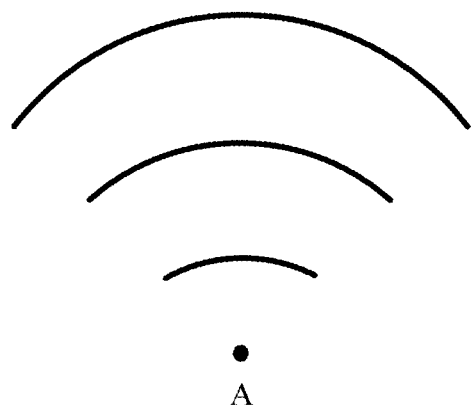
FIGS. 10a-10c illustrate schematic diagrams of examples of basic principle of beamforming consistent with some embodiments of the present disclosure.

Referring to FIG. 10a, in a case there may be one radiation portion, the signal transmitted or received by the radiation portion may be isotropically attenuated. In other words, directional selectivity may not be present, and one radiation portion cannot achieve beamforming.

Figure 10B:
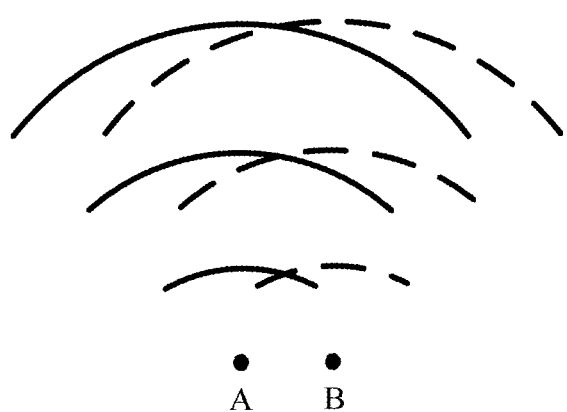
Figure 10C:
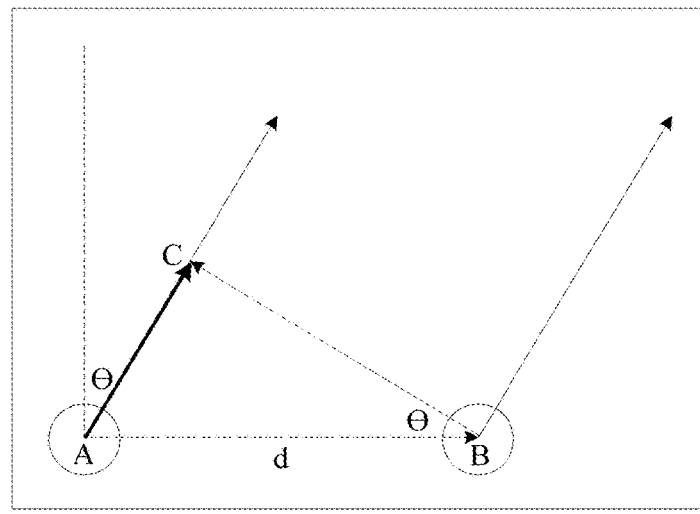

Referring to FIGS. 10b-10c, a set of radiation-portion arrays may include two or more radiation portions. In some embodiments, the two or more radiation portions may have the same amplitude. Here, two radiation portions are used as an example, and the two radiation portions are kept at a certain spacing. Referring to FIG. 10b, an interference phenomenon may occur between the two signals transmitted or received by the two radiation portions. In other words, by adjusting the phases of signals transmitted or received by the radiation portion A and the radiation portion B, the two signals may be coherently superimposed in a given direction, and may cancel each other in any other direction. In other words, beamforming may be realized. The beamforming illustrated in FIG. 10b may be abstracted into a mathematical pattern as illustrated in FIG. 10c. Referring to FIG. 10c, a set of radiation-portion arrays may include the radiation portion A and the radiation portion B, and the signals transmitted by the radiation portion A and the radiation portion B may constructively interfere in a given direction. Referring to FIG. 10c, the signal transmitted by the radiation portion A may have a component in the A (the position where the radiation portion A is located) to B (the position where the radiation portion B is located) direction, and the signal transmitted by the radiation portion B may have a component in the B to C direction. By adjusting the weighted sum of the two components to be directed to the given direction, the signals transmitted or received by the two radiation portions may be coherently superimposed in the given direction, and the signals transmitted or received by the two radiation portions may cancel each other in any other direction.

The input device may include a plurality of sets of radiation-portion arrays, and the different set of radiation-portion arrays may have a different given direction. Therefore, the positional relationship between the operation object 10 and the set of radiation portions may be obtained through the beamforming principle.

In some embodiments, as described above, one set of radiation-portion arrays may correspond to one given direction. The positional relationship between the operation object and the set of radiation portions determined by using one set of radiation-portion arrays may have a positional deviation. In some embodiments, in the disclosed embodiments of the present disclosure, the positional relationship between the operation object 10 and the set of radiation portions may be detected by using two or more sets of radiation-portion arrays.

The positional relationship between the operation object and the set of radiation portions may be detected by the above-described beamforming technology. The process of controlling the two sets of radiation-portion arrays to detect the positional relationship between the operation object and the set of radiation portions by a processing component 1101 may be described in conjunction with FIG. 11 below.

Figure 11:
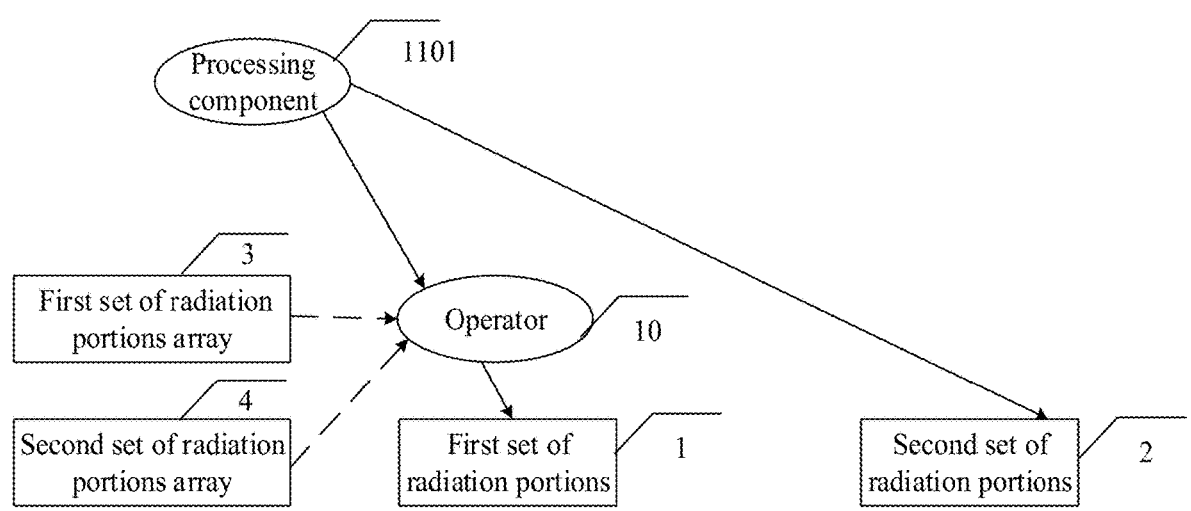
FIG. 11 illustrates a schematic diagram of an example of controlling two sets of radiation-portion arrays to detect positional relationship between an operator and a set of radiation portions by a processing component consistent with some embodiments of the present disclosure.

FIG. 11 illustrates a schematic diagram of an example of controlling two sets of radiation-portion arrays to detect positional relationship between an operation object and a set of radiation portions by a processing component consistent with some embodiments of the present disclosure. Referring to FIG. 11, the input device may include a first set of radiation portions 1, a second set of radiation portions 2, a first set of radiation-portion arrays 3, and a second set of radiation-portion arrays 4. The first set of radiation portions 1 and the second set of radiation portions 2 may be configured to complete the communication with the router. The first set of radiation-portion arrays 3 and the second set of radiation-portion arrays 4 may detect positional relationships between the operation object and the first set of radiation portions 1 and the second set of radiation portions 2 in the input device, respectively, based on the beamforming technology.

In some embodiments, the operation object may include one or more sub-operation objects, and the positional relationship between different sub-operation object and the set of radiation portions may be different.

Referring to FIG. 11, the first set of radiation portions 1 may be blocked by the operation object 10. After the signal transmitted by the router 91 to the first set of radiation portions 1 is blocked by the operation object 10, the signal strength may be attenuated, for example, the signal may be reflected. The second set of radiation portions 2 may not be blocked by the operation object 10, and, thus, the first set of radiation portions 1 may be switched to the second set of radiation portions 2.

The operation object may not always block a certain set of radiation portions. For example, the operation object may perform an interval operation on the force-receiving portions corresponding to one or more sets of radiation portions, based on the above-described third and fourth examples of trigger conditions, a plurality of sets of radiation portions may be switched back and forth.

To reduce the frequency of switching back and forth between the plurality of sets of radiation portions, the case where the trigger condition is satisfied may include the following.

In a fifth example, in response to the frequency at which at least local region of the first set of radiation portions is blocked by the operation object being greater than the frequency at which at least a local region of the second set of radiation portions is blocked by the operation object, the trigger condition may be satisfied.

In some embodiments, because the operation object 10 blocks at least a local region of the set of radiation portions, the signal strength of the signal transmitted or received by the set of radiation portions may be reduced. Therefore, the greater the frequency at which the operation object 10 blocks at least a local region of the set of radiation portions, the weaker the signal strength of the signal transmitted or received by the set of radiation portions.

In a sixth example, in response to the frequency at which the trigger portion corresponding to the first set of radiation portions generates an input signal being greater than the frequency at which the trigger portion corresponding to the second set of radiation portions generates an input signal, the trigger condition may be satisfied.

In some embodiments, as described above, after the force-receiving portion 11 receives the external force applied by the operation object 10, the moving portion 12 may move, for example, move downward. The moving portion 12 may press a corresponding trigger portion 13, and the trigger portion 13 may be pressed and deformed. Therefore, the trigger portion 13 may be electrically connected to generate an input signal. The greater the frequency of generating the input signal, the greater the frequency of applying a pressed force on the force-receiving portion 11 by the operation object 10.

On the one hand, each time the operation object 10 applies pressed force on the force-receiving portion 11 to cause the trigger portion 13 to generate an input signal, the set of radiation portions may cause loss, and the signal strength of the signal transmitted or received by the set of radiation portions may be weakened. On the other hand, each time the operation object 10 applies pressed force on the force-receiving portion 11 to cause the trigger portion 13 to generate an input signal, the operation object 10 may block at least a local region of the set of radiation portions, and the signal strength of the signal transmitted or received by the set of radiation portions may be weakened. Therefore, the smaller the frequency at which the operation object 10 applies pressed force on the force-receiving portion 11, the smaller the frequency at which the trigger portion 13 corresponding to the set of radiation portions generates the input signal, and the stronger the signal strength of the signal transmitted or received by the set of radiation portions.

In the above-described third to fifth examples of the trigger condition, the set of radiation portions may include one radiation portion, and the radiation portion may be disposed on the first force-receiving surface with a substantially large size of the force-receiving portion, e.g., the first force-receiving surface of the force-receiving portion 51 as illustrated in FIG. 5. The radiation portion may be disposed at one end of the first force-receiving surface of the force-receiving portion 51, in response to the operation object touching the other end of the force-receiving portion 51, the operation object may not block the radiation portion. This situation may not be detected based on any one of the examples of the trigger condition, but may be detected based on the sixth example of the trigger condition.

In the above-described embodiments, the set of radiation portions and the set of radiation-portion arrays may be described. In another embodiment of the present disclosure, the above-described set of radiation portions and the set of radiation-portion arrays may be described in detail.

In some embodiments, a set of radiation portions may include one or more radiation portions. In response to a set of radiation portions including a plurality of radiation portions, each of the radiation portions included in the set of radiation portions may be respectively disposed on the force-receiving portion at a non-adjacent position in the input device.

A set of radiation-portion arrays may include two or more radiation portions, and each of the radiation portions included in the set of radiation-portion arrays may be disposed on the force-receiving portion at an adjacent position in the input device.

In some embodiments, the set of radiation portions may be configured to communicate with the peer device as a set of communication radiation portions. Further, the set of radiation portions may include one or more radiation portions. In response to a set of radiation portions including two or more radiation portions and the two or more radiation portions being disposed substantially close, interference may occur between signals transmitted or received by the radiation portions. Thus, each of the radiation portions included in the set of radiation portions for communication may be respectively disposed on the force-receiving portion at a non-adjacent position in the input device.

In some embodiments, the set of radiation-portion arrays may be configured to detect a positional relationship between the operation object and the set of radiation portions. Further, the set of radiation-portion arrays may include two or more radiation portions. The two or more radiation portions in the set of radiation-portion arrays may be disposed substantially close, and, thus, the transmitted or received signals may be coherently superimposed in a given direction, and the transmitted or received signals may cancel each other in any other direction. Therefore, each of the radiation portions included in the set of radiation-portion arrays for determining the positional relationship between the operation object and the set of radiation portions may be disposed on the force-receiving portion at an adjacent position in the input device.

The present disclosure further provides an electronic device. In some embodiments, the electronic device may include any one of the input devices in the foregoing disclosed embodiments.

The electronic device may include a first main body having a display device, a second main body having an input device, and a connection device coupled to the first main body and the second main body. In some embodiments, the first main body may be a display screen; and the input device may be a device having a physical button, e.g., a keyboard, or a mouse. The connection device may be configured to enable the first main body to be movable with respect to the second main body.

In some embodiments, the location of a radiation portion 14a or 14b in the second main body of the electronic device provided by the disclosed embodiments of the present disclosure may include six or more types. Details may refer to the descriptions of the foregoing disclosed input device, which are not repeated herein.

In some embodiments, the input device may include a first region and a second region. Further, there may be a first distance between the first region and the connection device, and there may be a second distance between the second region and the connection device, where the first distance may be smaller than the second distance.

In some embodiments, the radiation portion may be disposed in the first region.

In some embodiments, the electronic device may be a notebook computer. Referring to FIG. 2, the first region may be the region 23, and the second region may be the region 24.

In some embodiments, the first region may be a function input region, and the second region may be a character input region. Further, after the force-receiving portion in the character input region is stressed, the trigger portion may generate a character input, and the first main body may display the mark set on the second force-receiving surface of the force-receiving portion. For example, the first main body may display a character "A".

In some embodiments, after the force-receiving portion in the function input region is stressed, the trigger portion may generate a function input, and the first main body may not display the mark set on the second force-receiving surface of the force-receiving portion. For example, after clicking "F11" in the function input region, the first main body may not display "F11", and may generate a corresponding function input of "F11". For example, the first main body may display the webpage displayed in a small window in full screen.

In some embodiments, the first region may be a region that is not blocked by the operation object 10 in response to performing an input on the input device by the operation object 10. The second region may be a region that is blocked by the operation object 10 in response to performing an input on the input device by the operation object 10.

In general, the region in the input device that is far from the connection device may be blocked in response to performing an input on the input device by the operation object.

In some embodiments, the second force-receiving surface of the force-receiving portion included in the input device may be provided with a mark. The first main body may include a first surface and a second surface that are oppositely disposed, and the second main body may include a third surface and a fourth surface that are oppositely disposed. The first main body and the second main body may be folded based on the connection device, such that the first surface of the first main body and the third surface of the second main body may be oppositely disposed.

In some embodiments, the opposite disposure of the first surface of the first main body and the third surface of the second main body may include the following. The first surface may be located on a side of the third surface facing away from the fourth surface, which may correspond to a case where the first surface is folded toward the third surface. Alternatively, the first surface may be located on a side of the fourth surface facing away from the third surface, which may correspond to a case where the first surface is folded away from the third surface.

In some embodiments, the disposure of the first surface on a side of the third surface facing away from the fourth surface may include the following. The first surface may be in contact with the third surface. Alternatively, there may be a gap between the first surface and the third surface.

In some embodiments, in response to the first surface being located on a side of the third surface facing away from the fourth surface, the third surface may include the second force-receiving surface of the force-receiving portion. The third surface may be located at a first end of the input device, and the mark may have a forward direction. The radiation portion may be disposed at a second end of the input device, and a direction from the first end to the second end of the input device may be the same as the forward direction.

The various embodiments in the present specification are described in a progressive manner. Each embodiment mainly describes in terms of differences from other embodiments, and the same or similar parts between the various embodiments may be referred to each other.

The relational terms, e.g., "first" and "second", etc., are used to distinguish one entity or operation from another entity or operation, and may not require or imply that such entities or operations have any such actual relationship or order between them. Moreover, the terms "include" and "contain" and their derivatives mean inclusion but not limitation. The term "or" is inclusive and means "and/or". The term "and/or" may be used to indicate that two associated objects may have three types of relations. For example, "A and/or B" may represent three situations: A exists, A and B coexist, and B exists.

In addition, the term "at least one of A, B and C" and their derivatives mean inclusion but not limitation. For example, the term "at least one system of A, B and C" may include but not be limited to the following situations: A exists, B exists, C exists, A and B coexist, A and C coexist, B and C coexist, and A, B and C coexist.

The method, apparatus, components and units in various embodiments of the present disclosure may be realized through a computing-capable electronic device that executes software containing computer instructions. The system may include a storage device to realize the various types of storage described above. The computing-capable electronic device may include but is not limited to a device capable of executing computer instructions, such as a general-purpose processor, a digital signal processor, a dedicated processor, and a reconfigurable processor, etc. Execution of such instructions may cause the electronic device to be configured to perform the above-disclosed respective operations. The above devices and/or units may be realized in one electronic device or in different electronic devices. The software may be stored in the computer-readable storage medium. The computer-readable storage medium may store one or more programs (software units). The one or more programs may include instructions that enable the electronic device to perform the disclosed methods in the present disclosure in response to executing the instructions by one or more processors in the electronic device.

In some embodiments, the software may be stored in a form of volatile memory or non-volatile memory device, such as a memory device like ROM, no matter whether it is erasable or rewritable. In other embodiments, the software may be stored in a form of memory (e.g., RAM, memory chip, device, or integrated circuit). In certain embodiments, the software may be stored in an optically readable medium or a magnetically readable medium, such as a CD, a DVD, a magnetic disk, or a magnetic tape, etc. The memory device and the memory medium are examples of machine-readable memory devices that are suitable for storing one or more programs. The one or more programs may include instructions that enable implementation of disclosed embodiments in response to being executed. The present disclosure provides the program and a machine-readable memory device that stores the program. The program may include codes of the apparatus or method for implementing any one of the claims in the present disclosure. In addition, the program may be electronically transmitted via any medium, such as communication signal carried over a wire connection or a wireless connection, and may be appropriately included in various embodiments of the present disclosure.

The description of some embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An input device, comprising:
one or more force-receiving portions, configured to receive an external force applied by an operation object;
a moving portion in contact with a surface of the one or more force-receiving portions, corresponding to each force-receiving portion and configured to move in response to the external force received on a corresponding force-receiving portion satisfying a first condition;
a trigger portion disposed adjacent to the moving portion, corresponding to each moving portion and configured to generate an input signal after a motion of a corresponding moving portion satisfies a second condition;
one or more radiation portions disposed at a plurality of locations on the input device or within the input device, configured to transmit or receive a wireless signal; and
a switching component electrically connected to the one or more radiation portions and configured to switch a first set of radiation portions that communicates with a peer device to a second set of radiation portions in response to a trigger condition being satisfied; wherein:
the trigger condition is associated with a signal strength of a signal sent by the peer device.

2. The input device according to claim 1, wherein:
the force-receiving portion is located at a side of the moving portion, and the radiation portion is disposed in at least a local region of a first force-receiving surface of the force-receiving portion, wherein the first force-receiving surface refers to a surface of the force-receiving portion close to the moving portion; or
the one or more force-receiving portions include two or more force-receiving portions, and the radiation portion is disposed on a force-receiving portion having a largest size among the two or more force-receiving portions.

3. The input device according to claim 1, wherein:
in a process of communication between the first set of radiation portions and the peer device, in response to the signal strength of the signal sent by the peer device and received by the first set of radiation portions being lower than a first threshold value, the trigger condition is satisfied; or in the process of communication between the first set of radiation portions and the peer device, in response to the signal strength of the signal fed back by the peer device and expected to be sent again by the input device being greater than a second threshold value, the trigger condition is satisfied.

4. The input device according to claim 1, further including:
a processing component, configured to control one or more sets of radiation-portion arrays to detect a positional relationship between the operation object and the set of radiation portions, wherein:
a set of radiation-portion arrays includes two or more radiation portions, and signals transmitted or received by each radiation portion included in the set of radiation-portion arrays are coherently superimposed in a given direction, the transmitted or received signals cancel each other in any other direction, and a different set of radiation-portion arrays has a different given direction.

5. The input device according to claim 4, wherein:
in a process of communication between the first set of radiation portions and the peer device, in response to an area of at least a first local region of the first set of radiation portions blocked by the operation object being larger than an area of a second local region of the second set of radiation portions blocked by the operation object, the trigger condition is satisfied;
in the process of communication between the first set of radiation portions and the peer device, in response to at least the first local region of the first set of radiation portions being blocked by the operation object and the second set of radiation portions not being blocked by the operation object, the trigger condition is satisfied;
in response to a frequency at which at least a local region of the first set of radiation portions is blocked by the operation object being greater than a frequency at which at least a local region of the second set of radiation portions is blocked by the operation object, the trigger condition is satisfied; or
in response to a frequency at which the trigger portion corresponding to the first set of radiation portions generates an input signal being greater than a frequency at which the trigger portion corresponding to the second set of radiation portions generates an input signal, the trigger condition is satisfied.

6. The input device according to claim 4, wherein:
the set of radiation portions includes one or more radiation portions;
in response to the set of radiation portions including a plurality of radiation portions, each radiation portion included in the set of radiation portions is respectively disposed on the force-receiving portion at a non-adjacent position in the input device; and
the set of radiation-portion arrays includes two or more radiation portions, and each radiation portion included in the set of radiation-portion arrays is disposed on the force-receiving portion at an adjacent position in the input device.

7. The input device according to claim 1, wherein:
the moving portion is disposed on a side of the trigger portion, and the radiation portion is disposed on an opposite side of the trigger portion.

8. The input device according to claim 1, wherein:
each force-receiving portion has a force-receiving surface, and the radiation portion is disposed between the force-receiving surface of the force-receiving portion and the trigger portion.

9. The input device according to claim 1, wherein:
the one or more force-receiving portions include two or more force-receiving portions,
the trigger portions respectively corresponding to the two or more force-receiving portions are separated by a spacing, and
the radiation portion at least uses the spacing to transmit or receive the wireless signal.

10. The input device according to claim 1, wherein:
the one or more force-receiving portions include two or more force-receiving portions, and
the radiation portion is locally disposed on the corresponding two or more force-receiving portions.

11. The input device according to claim 10, wherein:
a force-receiving surface of the force-receiving portion is provided with a mark,
the force-receiving surface is located at a first end of the input device, and the mark has a forward direction, and
the radiation portion is disposed at a second end of the input device, and a direction from the first end to the second end of the input device is the same as the forward direction.

12. The input device according to claim 10, wherein:
one or more force-receiving portions among the two or more force-receiving portions correspond to a character input region, wherein after the force-receiving portion in the character input region receives a force, the trigger portion generates a character input; and
one or more force-receiving portions among the two or more force-receiving portions belong to a function input region, wherein after the force-receiving portion in the function input region receives a force, the trigger portion generates a function input,
wherein the radiation portion is located in the function input region.

13. The input device according to claim 1, further including:
a metal supporting portion configured to fix each force-receiving portion, wherein the metal supporting portion is provided with a plurality of through-holes, and the radiation portion transmits or receives the wireless signal through the plurality of through-holes on the metal supporting portion; or
a metal supporting portion configured to fix each force-receiving portion, wherein the one or more force-receiving portions and the one or more radiation portions are located on a same side of the metal supporting portion.

14. An electronic device, comprising:
an input device, wherein the input device includes:
one or more force-receiving portions, configured to receive an external force applied by an operation object;
a moving portion in contact with a surface of the one or more force-receiving portions, corresponding to each force-receiving portion and configured to move in response to the external force received on a corresponding force-receiving portion satisfying a first condition;
a trigger portion disposed adjacent to the moving portion, corresponding to each moving portion and configured to generate an input signal after a motion of a corresponding moving portion satisfies a second condition;

one or more radiation portions disposed at a plurality of locations on the input device or within the input device, configured to transmit or receive a wireless signal; and a switching component electrically connected to the one or more radiation portions and configured to switch a first set of radiation portions that communicates with a peer device to a second set of radiation portions in response to a trigger condition being satisfied; wherein:

the trigger condition is associated with a signal strength of a signal sent by the peer device.

15. The electronic device according to claim 14, further including:

a first main body, having a display device;

a second main body, having the input device; and a connection device, coupled to the first main body and the second main body and configured to enable the first main body to be movable with respect to the second main body.

16. The electronic device according to claim 14, wherein:

the force-receiving portion is located at a side of the moving portion, and the radiation portion is disposed in at least a local region of a first force-receiving surface of the force-receiving portion, wherein the first force-receiving surface refers to a surface of the force-receiving portion close to the moving portion; or the one or more force-receiving portions include two or more force-receiving portions, and the radiation portion is disposed on a force-receiving portion having a largest size among the two or more force-receiving portions.

* * * * *